US008844135B2

(12) United States Patent
Denkmann et al.

(10) Patent No.: US 8,844,135 B2
(45) Date of Patent: Sep. 30, 2014

(54) METHOD FOR MANUFACTURING A TROUGH MIRROR FOR SOLAR TROUGH

(71) Applicants: Volker Denkmann, Kempen (DE); Wilhelm Schenkel, Grevenbroich (DE); Andreas Siemen, Jüchen (DE); Ulrich Hampel, Grevenbroich (DE); Sandra Eberhard, Jüchen (DE)

(72) Inventors: Volker Denkmann, Kempen (DE); Wilhelm Schenkel, Grevenbroich (DE); Andreas Siemen, Jüchen (DE); Ulrich Hampel, Grevenbroich (DE); Sandra Eberhard, Jüchen (DE)

(73) Assignee: Hydro Aluminium Rolled Products GmbH, Grevenbroich (DE)

( * ) Notice: Subject to any disclaimer, the term of this patent is extended or adjusted under 35 U.S.C. 154(b) by 0 days.

(21) Appl. No.: 13/888,965

(22) Filed: May 7, 2013

(65) Prior Publication Data

US 2013/0247354 A1     Sep. 26, 2013

Related U.S. Application Data

(63) Continuation of application No. PCT/EP2011/069608, filed on Nov. 8, 2011.

(30) Foreign Application Priority Data

Nov. 8, 2010 (DE) .................. 10 2010 050 506

(51) Int. Cl.
| | | |
|---|---|---|
| *B21D 53/00* | (2006.01) | |
| *F24J 2/12* | (2006.01) | |
| *B29D 11/00* | (2006.01) | |
| *F24J 2/14* | (2006.01) | |
| *B23P 13/04* | (2006.01) | |
| *F24J 2/10* | (2006.01) | |
| *F24J 2/52* | (2006.01) | |
| *F24J 2/46* | (2006.01) | |

(52) U.S. Cl.
CPC ............ *B23P 13/04* (2013.01); *F24J 2002/522* (2013.01); *F24J 2002/4663* (2013.01); *B29D 11/00596* (2013.01); *F24J 2002/5224* (2013.01); *F24J 2/145* (2013.01); *Y02E 10/45* (2013.01); *F24J 2/1057* (2013.01)
USPC .................. 29/890.033; 29/458; 126/694

(58) Field of Classification Search
USPC ................. 29/890.033, 458, 527.2; 126/694; 136/206, 251
See application file for complete search history.

(56) References Cited

U.S. PATENT DOCUMENTS

| | | | | |
|---|---|---|---|---|
| 4,372,027 A | * | 2/1983 | Hutchison | ........................ 29/448 |
| 4,423,719 A | | 1/1984 | Hutchison | |
| 5,830,779 A | * | 11/1998 | Bressler et al. | ................. 438/65 |
| 5,964,216 A | * | 10/1999 | Hoffschmidt et al. | ........ 126/696 |
| 6,414,237 B1 | * | 7/2002 | Boer | ............................. 136/251 |
| 2010/0032016 A1 | | 2/2010 | Gee et al. | |
| 2011/0247681 A1 | * | 10/2011 | Wu | ............................... 136/251 |

* cited by examiner

*Primary Examiner* — Jermie Cozart
(74) *Attorney, Agent, or Firm* — Reinhart Boerner Van Deuren P.C.

(57) ABSTRACT

The invention relates to a method for manufacturing a trough mirror for a solar trough, in particular longitudinal solar trough mirrors for solar power stations. One object is to provide a method for manufacturing a trough mirror for a solar trough mirror power station which reduces the costs for installing the solar power station.

11 Claims, 4 Drawing Sheets

METHOD FOR MANUFACTURING A TROUGH MIRROR FOR SOLAR TROUGH

CROSS-REFERENCE TO RELATED PATENT APPLICATIONS

This patent application is a continuation of PCT/EP2011/069608, filed Nov. 8, 2011, which claims priority to German Application No. 10 2010 050 506.4, filed Nov. 8, 2010, the entire teachings and disclosure of which are incorporated herein by reference thereto.

FIELD OF THE INVENTION

The invention relates to a method for manufacturing a trough mirror for a solar trough, in particular longitudinal solar trough mirrors for solar power stations.

BACKGROUND OF THE INVENTION

So far the mirrors of solar power stations are either made of glass or a substrate comprising a laminated or coated reflection film. For the heavy mirrors made of glass subconstructions made of steel or aluminum are used to mount the glass mirrors. On these subconstructions preferably parabolic trough mirror sections made of glass are usually mounted. Beside glass mirrors also mirrors made of aluminum which comprise a surface with high reflectivity as well as mirrors made of an aluminum substrate or composite material with a laminated or coated high reflective film are known. Contrary to the mirrors made of glass the aluminum mirrors are of course light and robust. Additionally derived from the construction of airplanes the mirror itself can be the supporting structure. Different types of mirrors are self-supporting. As outlined above these mirrors comprise a light weight substrate which is laminated or coated with high reflectivity film. The substrate may be made of a composite material for example of a sandwich construction of two aluminum or aluminum alloy layers with an interposed layer made of a polymer or an interposed layer made of a structured aluminum alloy foil or sheet. The structured aluminum alloy layer may comprise a wave or trapezoid cross-sectional shape. However, for these self supporting aluminum mirrors the parabolic shape of the self-supporting mirrors has to be preformed. One less expensive type of these aluminum mirrors is the sky fuel system which comprises sheets which are laminated or coated with a film with high reflectivity for the sunlight which are guided in slides of a sub construction of the trough mirrors. Prefabricated sheets are guided into the mentioned slides to install the trough mirrors of the solar power station. Solar power generation, however, needs for large scale arrays of mirrors. Since linear solar trough mirrors having parabolic cross-sections are the preferred shapes for solar troughs, a high number of prefabricated sheets has to be transported to the location of solar power station. As solar power stations are often installed in uninhabited areas the transportation costs of the preformed sheets become an important factor for the expenses for installing a solar power station. Thus, the present manufacturing methods for trough mirrors of a solar power station are not optimized in the view of the installation costs.

SUMMARY OF THE INVENTION

Starting from this prior art the present invention has the object to provide a method for manufacturing a trough mirror for a solar trough mirror power station which reduces the costs for installing the solar power station. Additionally, the present invention has the object to provide a solar trough mirror with low installation costs.

According to a first aspect of the present invention the above-mentioned object is solved by a method for manufacturing a trough mirror for solar trough mirror comprising the steps:
providing a coil of a strip comprising a first substrate which is coated or laminated at least on one side with a reflection film for reflecting sunlight,
providing a first and a second slide which both extent perpendicular to the longitudinal direction of the solar trough mirror having substantially the shape of the cross-section of the solar trough mirror and which are arranged to guide the opposite edges of one coated sheet,
uncoiling the strip from the coil and cutting the strip subsequently into sheets,
guiding the strip during uncoiling or guiding the sheets subsequently to cutting the strip into sheets with their opposite edges into the first and second slide in that the coated sheet get the shape of at least a section of the trough mirror and
fixing said sheet in the slides with fixing means so that at least one sheet is carried by a pair of slides.

With the above-mentioned method it is possible to deliver the material for manufacturing the trough mirrors to the place where the solar power station has to be installed easily, by transporting coils to the construction side. The coiled strip comprising a substrate on which the reflection film is coated or laminated may serve for manufacturing a high number trough mirrors at a time. Thus, transporting the necessary coils to the place of the solar power station reduces the costs remarkably.

According to a first embodiment of the present invention the inventive method takes place directly at the location of the solar power station respectively at the construction side of the solar power station. As a result, there is no need for transporting prefabricated trough mirrors at all. Thus, the transportation costs for reflective mirrors to be installed at a solar power station are reduced to a minimum.

According to a next embodiment of the method the first substrate comprises at least one layer of a metal, a lacquered aluminum or aluminum alloy layer, a type of a polymer layer or a fiber reinforced polymer layer or a layer of a composite material. Of course a strip made of a metal, for example steel or aluminum or aluminum alloy can easily be provided, coated or laminated on one side with a reflection film and cut into sheets. Furthermore, a lacquered aluminum or aluminum alloy layer has the advantage that the aluminum or aluminum alloy layer is protected at least from one side from corrosion and therefore enhances life time of the mirror. Additionally, aluminum or an aluminum alloy is light weighted. Furthermore, using a polymer layer or a fiber reinforced polymer layer as the first substrate the weight of a trough mirror can be reduced further. In principle the same allows the use of a composite material layer as a first substrate whereby a composite material layer additionally may provide a very high strength accompanied by a light-weight construction. Nevertheless, the composite material usable for the invention must be able to be coiled on coil. As outlined before, composite materials may be for example a polymer layer with an aluminum or aluminum alloy layer. The aluminum or aluminum alloy layer may have a wave or trapezoid cross section. Nevertheless, other composite materials which may be provided as a strip may be usable for the first substrate.

According to another embodiment the aluminum or aluminum alloy layer has a thickness of 0.2 mm-3 mm, preferably 0.2 mm to 1.5 mm to provide the necessary strength and stiffness. Using an aluminum alloy layer allows to adapt the thickness of this layer to the aimed mechanical parameters necessary for a trough mirror during its installation as well as in operation mode.

Optionally the strip made of aluminum or an aluminum alloy layer substrate coated with a film with high reflectivity may be provided with an edge protection on both edges of the strip, which protects against undercutting the reflection film by humidity and therefore protects the coated or laminated mirror substrate against a reduction of the reflectivity. The edge protection may be affixed to the mirror substrate at the place of the installation of the trough mirror or as well may be affixed inline with laminating the substrate or inline with lacquering an aluminum alloy strip. The edge protection may be provided easily for example with an adhesive tape or a coating like silicone or an adhesive sealing which itself has a barrier effect on humidity.

According to a further embodiment of the present invention a plurality of slides are mounted on a trough mirror mount so that a plurality of coated sheets are arranged side by side to form a linear solar trough mirror. In particular mounting a plurality of slides on a trough mirror mount allows easy install of the linear solar trough mirror with low costs.

According to a next embodiment of the inventive method at least one slide comprises at least two C-shaped profiles and fixing means to fix one of the C-shaped profiles to the other in a position in which the edge of a coated sheet is clamped between the two C-shaped profiles. C-shaped profile is very easy to manufacture and therefore does involve very low production costs. The expenses to install the trough mirror can be therefore reduced further. One of the C-shaped profiles may comprise an additional web leading to an E-shaped cross-section which ensures a higher stiffness of this profile. Thus, other suitable cross-sections are possible, too. Nevertheless, the complexity of the profiles may raise their production costs.

To facilitate mounting of two coated sheets arranged in slides side by side according to a further embodiment the slide comprises three profiles, wherein the first and a second C-shaped profile are arranged in mirror symmetrical manner with their openings directing in opposite directions within a slot of a third profile and the third profile comprises fixing means to fix each of the two C-shaped profiles to the third profile in a position in which one coated sheet between each C-shaped profile and the slotted profile is fixed. The slotted profile may have for example a rectangular section. However, other cross-sectional shapes are allowed for the third profile, as long as it allows fixing both C-shaped profiles.

According to another embodiment of the inventive method at least one slide comprises a profile with a H-shaped cross-section instead of the first and second C-shaped profile. With this embodiment a single H-shaped profile can provide the function of the two C-shaped profiles and therefore reduces again the expenses to install a trough mirror.

According to another embodiment the edges of the coated sheet are sealed by sealing means arranged in the slides prior to guiding the sheet or strip into the slide. The sealing means may be provided by a sealant placed in the slides or a sealing arranged in the slides for example. Additionally, to the edge protection the sealing inhibits humidity to creep beyond the high reflective film and therefore protects the trough mirror against a loss of reflectivity.

According to another embodiment the above-mentioned method further comprises the steps:
providing a second coil of a strip made of the second substrate,
providing a third and a fourth slide which extend perpendicular to the longitudinal direction of the solar trough, which are each arranged below the first and the second slide,
uncoiling the strip of the second substrate from the coil and cutting the strip into sheets,
guiding the edges of the strip during uncoiling or subsequently to cutting of the strip into sheets guiding the edges of the sheets into the third and fourth slide in that the guided sheet or strip made of the second substrate is arranged below the coated sheet and forms a hollow space with the coated sheet,
filling the hollow space between the coated strip or sheet and the strip or sheet made of the second substrate with a filler material.

The second substrate may be for example a metal strip in particular an aluminum or aluminum alloy strip, a composite material strip, a polymer strip or a fiber enforced polymer strip. As filling material for example polyurethane foam may be used. However, other filler materials which allows a rigid connection between the coated mirror sheet and the sheet made of the second substrate may be used either. The advantage of this embodiment is that the stiffness of the construction respectively of the trough mirror is provided by filling the hollow space between the coated sheet and the sheet made of the second substrate with a filler material, which allows that the coated sheet and the sheet made of the second substrate to be very thin. The afore-mentioned method is in particular advantages if it takes place at the location where the solar power station has to be installed.

Furthermore, according to a next embodiment of the method each profile of a slide comprises a contact area which is in contact with a coated sheet or a sheet made of a second substrate and which further comprises means to fix said sheet by a force closure or a form fit to said slide. Such fixing means may be provided by beadings or protrusions located at the contact area of each profile which are used to clamp the sheets.

According to another aspect of the present invention the above-mentioned object is solved by a solar trough mirror manufactured with the inventive method comprising at least one coated sheet arranged between a first and a second slide, whereby the coated sheet is made of a strip, the opposite edges of the strip are guided by said slides, the strip is cut into sheets and fixed between the slides immediately after uncoiling the strip from a coil. As already outlined, by guiding and fixing the coated sheet cut of a strip immediately after uncoiling the strip within the slides, the coated sheet is formed into the cross-sectional shape of the trough mirror. Transportation of preformed sheets is not longer necessary. Therefore, manufacturing costs are reduced by the inventive solar trough mirror.

A first embodiment of the solar trough mirror is characterized in that the solar trough comprises a trough mirror mount on which a plurality of slides is mounted so that a plurality of coated sheets are arranged side by side to form a linear solar trough mirror. This allows installing a linear solar trough mirror with reduced costs, because only a few coils of the reflective coated strip have to be transported to the construction side to construct a huge number of trough mirrors.

According to a next embodiment of the solar trough mirror each slide comprises a plurality of screws as fixing means to fix the sheets between the profiles of each slide. With screws the coated sheets within the slide may be easily fixed and secure that their position does not move during for example a tilting operation of the solar trough mirror. In particular the screws can adjust the position of each profiles of each slide so that the fixing means, for example beadings or protrusions, in the contact area of the profiles may get into a position which allows for a force closure or a form fit closure. The screws only need holes in the particular profile with a screw thread.

According to a next embodiment of the solar trough mirror a sealing or a sealant is arranged for sealing the opposite edges of the coated sheet within each slide.

According to a further embodiment of the solar trough mirror at least one slide comprises at least two C-shaped profiles and at least fixing means to fix one of the C-shaped profiles to the other in a position in which the edge of a coated sheet can be clamped between the two C-shaped profiles.

According to a further embodiment of the solar trough mirror at least one slide comprises three profiles, wherein a first and a second C-shaped profile are arranged in mirror symmetrical manner with their openings directing in opposite directions within a slot of a third profile and the third profile comprises fixing means to fix each of the two C-shaped profiles to the third profile in order to fix one coated strip between each C-shaped profile and the slotted profile separately.

The invention relates to a method for manufacturing a trough mirror for a solar trough, in particular longitudinal solar trough mirrors for solar power stations. The object to provide a method for manufacturing a trough mirror for a solar trough mirror power station which reduces the costs for installing the solar power station is solved by a method for manufacturing a trough mirror for solar trough mirror comprising the steps, providing a coil of a strip comprising a first substrate which is coated or laminated at least on one side with a reflection film for reflecting sunlight, providing a first and a second slide which both extent perpendicular to the longitudinal direction of the solar trough mirror having substantially the shape of the cross-section of the solar trough mirror and which are arranged to guide the opposite edges of one coated sheet, uncoiling the strip from the coil and cutting the strip subsequently into sheets, guiding the strip during uncoiling or guiding the sheets subsequently to cutting the strip into sheets with their opposite edges into the first and second slide in that the coated sheet get the shape of at least a section of the trough mirror and fixing said sheet in the slides with fixing means so that at least one sheet is carried by a pair of slides.

According to a further embodiment of the solar trough mirror at least one slide comprises one H-shaped profile instead of the first and second C-shaped profile.

With respect to the advantages of the last four embodiments of a solar trough mirror mentioned above it is referred to the corresponding embodiments of the inventive method of manufacturing the solar trough mirror.

BRIEF DESCRIPTION OF THE DRAWINGS

Further on, the present invention shall be described in connection with embodiments shown in the drawings. In the drawings shows FIG. 1 a perspective view of a solar trough mirror as known from the prior art, FIG. 2 a perspective, schematical view of a first embodiment of the manufacturing method, FIG. 3 a sectional view of an second embodiment of the coated sheet of a trough mirror with an edge protection, FIG. 4 a schematical perspective view of a substrate able to be coiled made of a composite material according to a third embodiment, FIG. 5 a schematical view of a fourth embodiment of the manufacturing method, FIG. 6 a schematical, perspective view of a trough mirror manufactured by the fourth embodiment of the manufacturing method, FIG. 7 a perspective view of an embodiment of the slides used for the manufacturing method, FIG. 8, 9 sectional views of two further embodiments of the slides used for the manufacturing method.

DETAILED DESCRIPTION OF THE INVENTION

Figure 1:
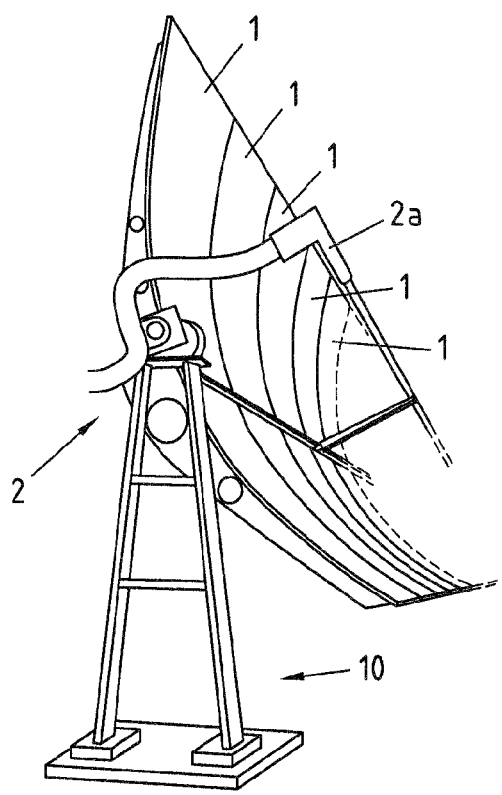

FIG. 1 shows in a perspective view a module 2 of a solar trough mirror power station with a plurality of side by side arranged solar trough mirrors 1. The solar trough mirrors 1 shall reflect the incident solar radiation onto a receiver 2a which is able to convert the solar radiation into heat which is subsequently used for power generation. A large scaled solar trough mirror power station needs a huge number of solar trough mirror power station modules 2. Therefore a very high number of solar trough mirrors 1 have to be installed. Due to the high number of solar trough mirrors 1 the effort for transportation of the trough mirrors is remarkable.

Figure 2:
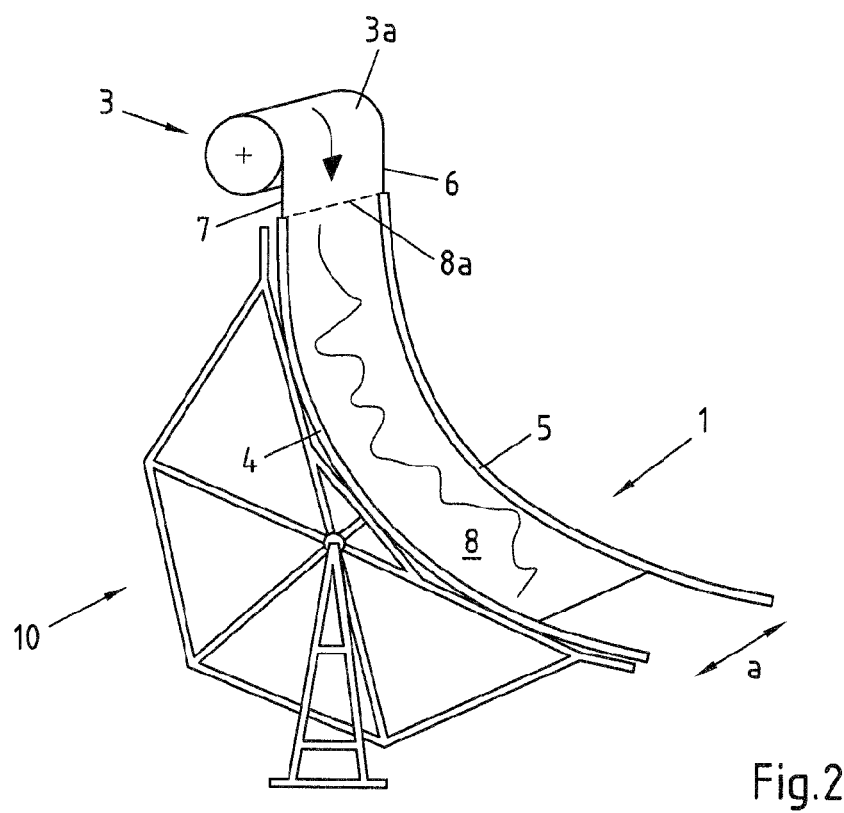

FIG. 2 now shows a first embodiment of the manufacturing method in a schematical perspective view. At first FIG. 2 shows a coil 3 of a strip 3a. The strip 3a comprises a substrate 3b which is coated or laminated on one side with a film having a high reflectivity for sunlight. Furthermore, a first and a second slide 4, 5 are provided which extend perpendicular to the longitudinal direction of the solar trough mirror 1 having substantially the shape of the cross section of the solar trough mirror 1. The slides 4, 5 are arranged in order to guide the opposite edges 6, 7 of the coated strip 3a, respectively of a coated sheet 8 after cutting it from the strip 3a. The coil 3 is turning and the strip 3a is guided through the slides 4, 5 in order to get the cross-sectional shape of the trough mirror 1. As can be depicted from FIG. 2 the strip is guided during uncoiling with its opposite edges 6, 7 in the first and second slide 4, 5. When the strip 3a reaches the end of the slides 4, 5 the strip 3a is cut at line 8a to become a sheet 8. Of course it is possible to first cut the strip into sheets 8 and guide them into the slides 4, 5 immediately after uncoiling of the coiled strip. The distance between the two slides depends on the width of the strip 3a used for manufacturing the trough mirror, which may be for example 800 mm to 2000 mm, preferably 1000 mm-1500 mm. In principle it is possible to use the whole width of a strip for one trough mirror or a trough mirror section. Once the sheet 8 respectively the strip 3a is guided by slides 4, 5 and reaches the end of the slides 4, 5 the sheet 8 is fixed with fixing means within the slides, wherein the fixing means are not shown in FIG. 2.

Further FIG. 2 shows that the plurality of slides 4, 5 may be mounted on a trough mirror mount 10 so that a plurality of coated sheets 8 may be arranged side by side to form a linear solar trough mirror or a linear solar trough mirror module as shown in FIG. 1.

Figure 3:
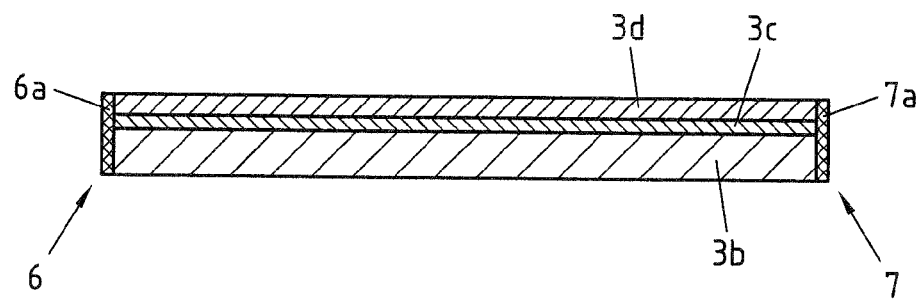

An embodiment of the strip 3a which may be used for manufacturing trough mirrors is shown in a schematical, sectional view in FIG. 3. The strip 3a comprises a substrate 3b which may be for example a metal layer, preferable a layer of aluminum or an aluminum alloy, more preferably the substrate comprises allocate aluminum or aluminum alloy layer, a type of polymer or fiber reinforced polymer or a composite material layer 3b. If an aluminum or aluminum alloy layer 3b is used, than a preferred thickness of the aluminum layer is about 0.5 mm to 3 mm. On top of the aluminum or aluminum alloy layer 3b may be provided a lacquer coat 3c to protect the aluminum lay against corrosion. Furthermore, a reflective film 3d for reflecting the sunlight is coated or laminated on the lacquered aluminum layer or lacquered aluminum alloy layer. Using aluminum or an aluminum alloy as a substrate the trough mirror does not only become rigid and stiff, the mirror is also light weight and robust against environmental influences for example temperatures. Nevertheless, the substrate 3b may also be build by a polymer of fiber reinforced polymer layer. The opposite edges 6, 7 of the strip are protected already by an adhesive tape 6a, 7a. Preferably the adhesive tape 6a, 7a features a barrier for humidity. However, other edge protections may be realized for example with a coating like silicone.

Figure 4:
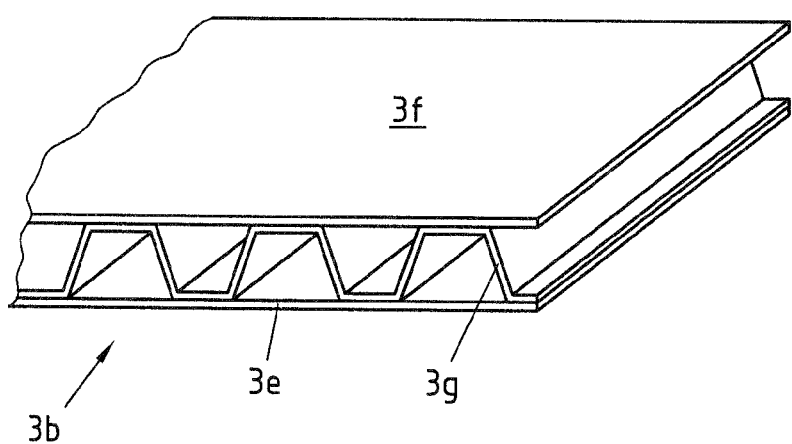

A substrate 3b which comprises a composite material layer shows FIG. 4 in a further embodiment. The substrate 3b comprises according this embodiment of two liner 3e, 3f made of for example an aluminum alloy or another metal and an interposed structured layer 3g, which comprises for example a trapezoid cross-section. The advantage in using a composite material is that, although the composite material has to be provided as a strip coiled on a coil 3 it provides a very high stiffness combined with a very low weight. In particular, since the geometrical shape of the trough mirror is very important for the function of the solar trough mirror power station the trough mirror 1 ensures a long term stability of its geometrical shape. Nevertheless, other composite materials which are able to be coiled on a coil may serve as well as a substrate for the reflective film.

Figure 5:
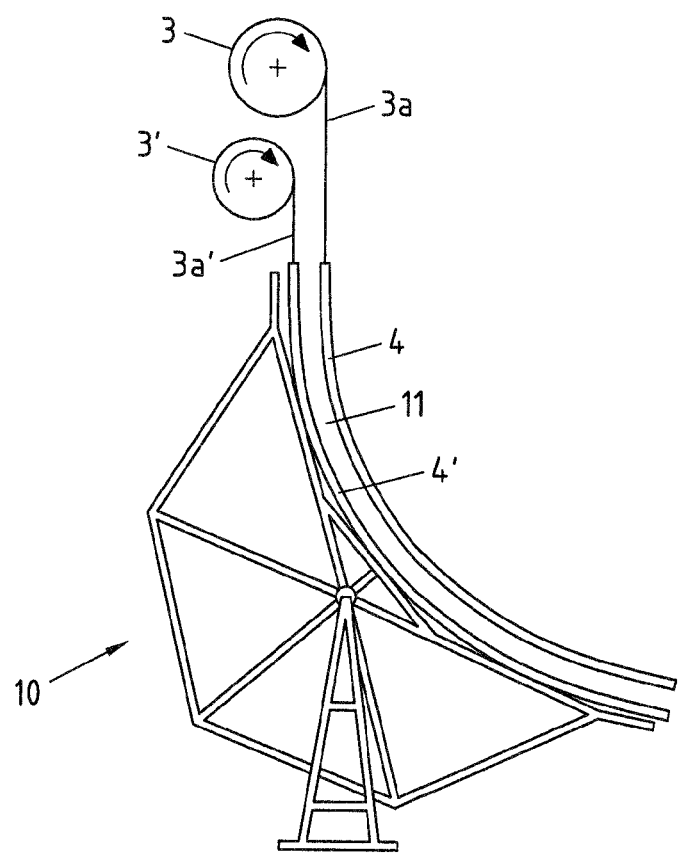

Another embodiment of the inventive method is shown schematically in FIG. 5. A second coil 3' with a coiled strip 3a' comprising a second substrate is arranged below coil 3. With the additional third and forth slides 4', 5' (the fourth slide is not shown in FIG. 5) which extend perpendicular to the longitudinal direction of the solar trough mirror 1 and which are arranged below the first and the second slides another embodiment of a trough mirror 1 can be manufactured. The trough mirror 1' consists of a sheet 8 made of the first strip 3a which is coated with a high reflecting film on top of it. The second sheet 8' made of the strip 3a' is arranged below the first sheet 8 and builds the hollow space 11 between the first sheet 8 and the second sheet 8'. By guiding the edges of both strips during uncoiling or subsequently to cutting the strips 3a, 3a' into sheets 8, 8' and guiding the edges of the sheets 8, 8' into slides 4', 5' (5' not shown) said shape of the second strip 3a' may be adapted to the shape of the coated strip 3a to form a hollow space 11 between both strips.

Figure 6:
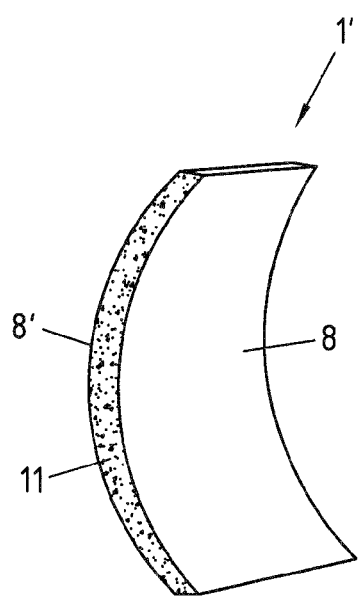

FIG. 6 shows in a perspective view a trough mirror 1' manufactured according to a second embodiment of the present inventive method for manufacturing trough mirrors for solar trough mirror power stations. The hollow space 11 is filled with a filler material, for example with polyurethane foam. However, it is possible to use other filler materials as well in order to get a good connection between the first coated sheet 8 and the second sheet 8'. As outlined before the substrate of the second strip 3a' may be a metal, polymer or reinforced polymer or even a composite material as described above. The advantage of this embodiment of a trough mirror is that the mirror can be very rigid and light weighted.

Figure 7:
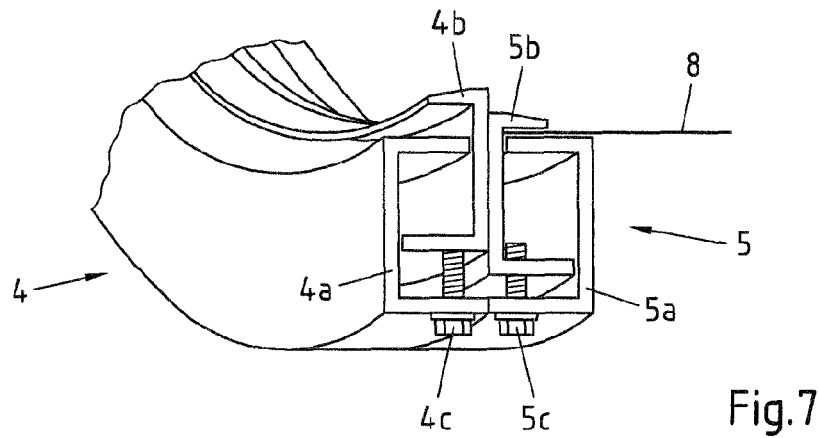

FIG. 7 shows slides 4, 5 in a perspective view which are used to guide the strip 3a or 3a' during manufacturing of the solar trough mirror. Both slides 4, 5 comprises at least two C-shaped profiles 4a, 4b, 5a, 5b and fixing means 4c, 5c to fix a coated sheet 8 between the two C-shaped profiles 4a, 4b or 5a, 5b. As can be derived from FIG. 7 each coated mirror sheet 8 has its own pair of slides 4a, 4b or 5a, 5b so that a replacement of a single trough mirror by replacing a single coated sheet 8 is possible and easy.

As fixing means 4c, 5c FIG. 7 shows two screws with which the distance between the profiles 4a and 4b or 5a and 5b may be adjusted so that the sheet 8 is clamped between both profiles 4a, 4b or 5a, 5b. The C-shaped profiles 4a, 4b, 5a, 5b are very simple in its shape and therefore is producible with low costs. The slides 4, 5 as shown in FIG. 7 have the shape of a cross-section of the trough mirror 1.

Figure 8:
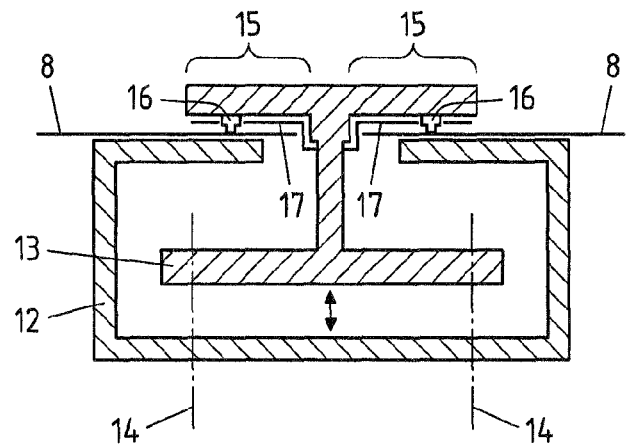
Figure 9:
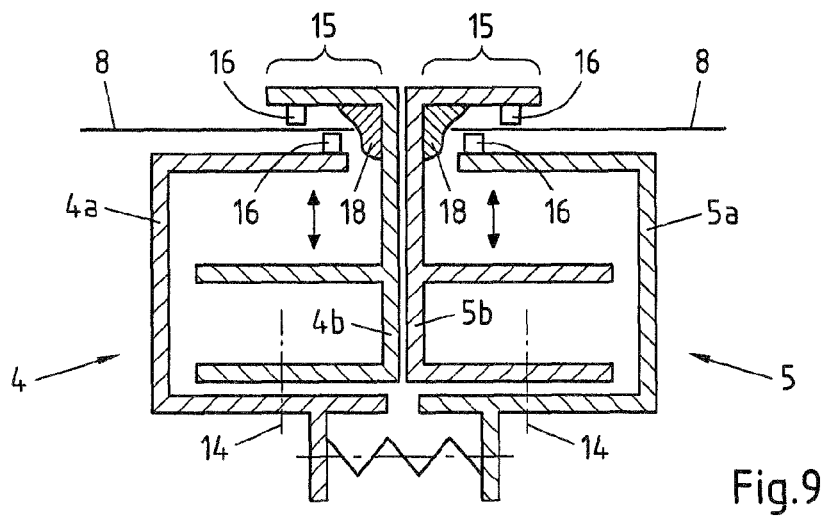

FIG. 8 and FIG. 9 show two additionally embodiments of slides 4, 5 in a cross-sectional view. In FIG. 8 only two profiles 12, 13 and fixing means 14 are necessary to fix two coated sheets 8. The profile 13 has an H-shaped cross-section, whereas profile 12 is a slotted profile which has in the present embodiment a rectangular cross-section. Both profiles 12, 13 provide a contact area 15 in which a sheet 8 is clamped between those two profiles by a force closure or in a form fit manner. To enhance fixing of the sheets 8 one of the profiles 12, 13 or both comprise means 16 to fix the sheet by force closure or by a form fit. In the present embodiment means to fix the sheet are provided as protrusions in the H-shaped profile 13. Additionally, in FIG. 8 shows a sealant 17 which is placed in the slide 4, 5 prior to guiding the sheets 8 into the slides 4, 5.

A sealing 18 which is placed in the slides 4, 5 is shown in FIG. 9 in a cross-sectional view of a further embodiment of the slides 4, 5. Each slide 4, 5 comprise two profiles 4a, 4b and 5a, 5b, whereat the profile 4a, 5a has a C-shaped cross-section and the profile 4b, 5b has an E-shaped cross-section. However, profiles 4b, 5b are arranged with their openings directing in opposite directions so as to form a contact area 15 for two different coated sheets 8. Since the second profile 4b, 5b has a more complex cross-section than a C-shaped profile it provides a higher stiffness than the simple C-shaped profiles shown in FIG. 7. Additionally, as fixing means for clamping the sheets 8 between both profiles 4a, 4b or 5a, 5b screws 14 are provided with which a distance between the profiles 4a, 4b and 5a, 5b can be adjusted.

Due to the simple construction of the slides and the simple manufacturing method for trough mirrors 1 the expenses for installing a solar trough mirror power station can be reduced remarkably.

The invention claimed is:

1. Method of manufacturing a trough mirror for a solar trough mirror power station comprising the steps:
   providing a coil of a strip comprising a substrate which is coated or laminated at least on one side with a reflection film for reflecting sunlight,
   providing a first and a second slide which both extend perpendicular to the longitudinal direction of the trough mirror having substantially the shape of the cross-section of the solar trough mirror and which are arranged to guide the opposite edges of the strip,
   uncoiling the strip from the coil and cutting the strip subsequently into sheets,
   guiding the strip during uncoiling or guiding a sheet subsequently to cutting the strip into sheets with their opposite edges into the first and second slide in that the strip or sheet gets the shape of at least a section of the trough mirror and
   fixing said strip or sheet in the slides with fixing means so that at least one strip or at least one sheet is carried by the first and second slides.

2. Method according to claim 1, wherein said steps of providing a coil of a strip, providing a first and second slide, uncoiling the strip and cutting the strip subsequently into sheets, guiding the strip during uncoiling or guiding sheet subsequently to cutting the strip into sheets, and fixing said strip or sheet takes place directly at the location of a solar power station.

3. Method according to claim 1, wherein the substrate comprises at least one layer of a metal, a lacquered aluminum or aluminum alloy, a type of a polymer or fiber reinforced polymer or a composite material.

4. Method according to claim 3, wherein the aluminum or aluminum alloy layer has a thickness of 0.3 mm to 3 mm.

5. Method according to claim 1, wherein a plurality of slides are mounted on a trough mirror mount so that a plurality of strips or sheets are arranged side by side to form a linear solar trough mirror.

6. Method according to claim 1, wherein each first and second slide comprises at least two C-shaped profiles and fixing means to fix one of the C-shaped profiles to the other in a position in which the edge of the strip or sheet is clamped between the at least two C-shaped profiles.

7. Method according to claim 1, wherein the first and second slides together comprise three profiles, wherein a first and a second profile of the three profiles are C-shaped profiles and are arranged in mirror symmetrical manner with their openings directing in opposite directions within a slot of a third profile of the three profiles, and the third profile comprises fixing means to fix each of the two C-shaped profiles to the third profile in a position in which one strip or sheet between each C-shaped profile and the slotted profile is fixed.

8. Method according to claim 7, wherein at least one of the first and second slide comprises one H-shaped profile.

9. Method according to claim 1, wherein a profile of each of the first and second slides comprises a contact area which is in contact with a coated sheet or a sheet made of a second substrate and which further comprises means to fix said sheet by a force closure or a form fit to said slide.

10. Method according to claim 1, wherein the edges of the strip or sheet are sealed by sealing means arranged in the slide prior to guiding the sheet or strip into the slide.

11. Method according to claim 1, wherein the method further comprises the steps of:
 providing a second coil of a strip comprising a second substrate,
 providing a third and a fourth slide which extend perpendicular to the longitudinal direction of the solar trough, which are each arranged below the first and the second slide,
 uncoiling the strip of the second substrate from the coil and cutting the strip into sheets,
 guiding the edges of the strip during uncoiling or subsequently to cutting of the strip into sheets guiding the edges of the sheets into the third and fourth slide in that the guided sheet or strip made of the second substrate is arranged below the coated sheet and forms a hollow space with the coated sheet,
 filling the hollow space between the coated strip or sheet and the strip or sheet made of the second substrate with a filler material.

* * * * *